Sept. 13, 1949.   W. LEDUC   2,481,601
CABLE BRACE-BAR OPHTHALMIC MOUNTING
Filed Jan. 31, 1946
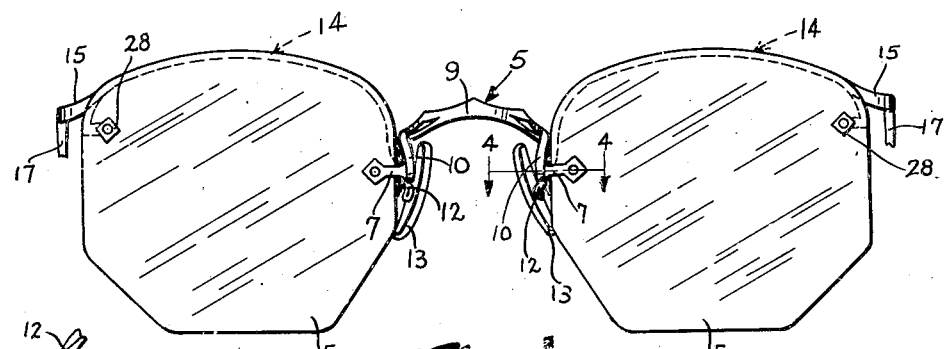
Fig. 1
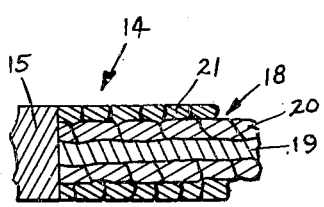
Fig. 4
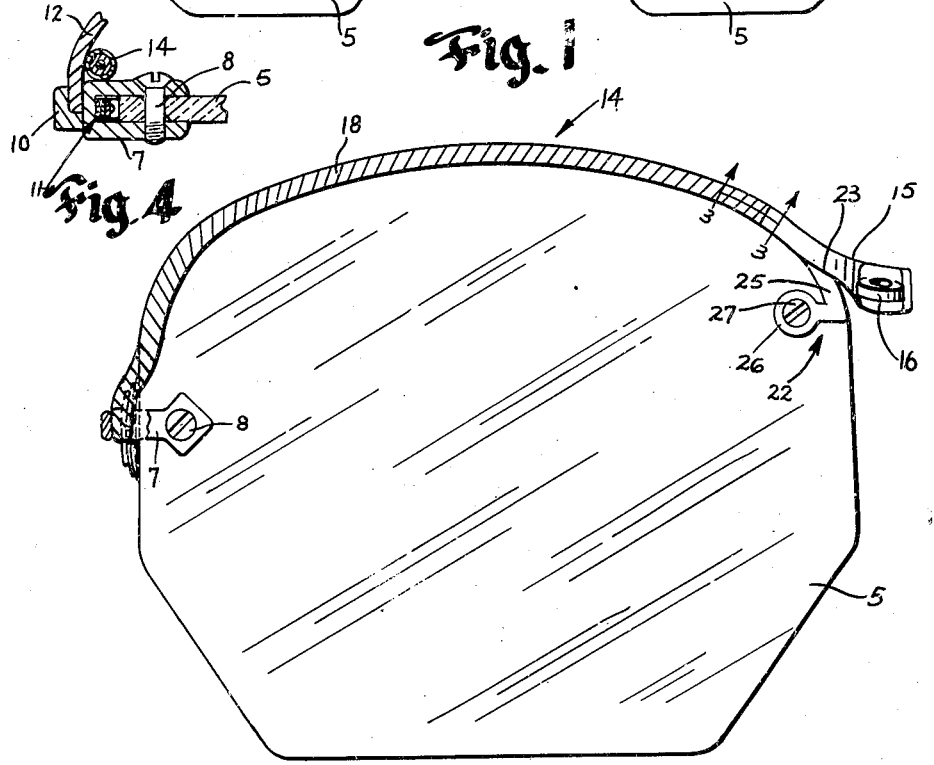
Fig. 2
Fig. 3
INVENTOR.
WILBUR LEDUC
BY
*Louis L. Gagnon*
ATTORNEY Patented Sept. 13, 1949

2,481,601

UNITED STATES PATENT OFFICE 2,481,601

CABLE BRACE-BAR OPHTHALMIC MOUNTING

Wilbur Leduc, Southbridge, Mass., assignor to American Optical Company, Southbridge, Mass., a voluntary association of Massachusetts Application January 31, 1946, Serial No. 644,488

1 Claim. (Cl. 88—41)

This invention relates to improvements in ophthalmic mountings and has particular reference to a mounting of a half-rim type and to new and novel means and method of forming the lens supporting structure and assembling said structure with the lenses.

One of the principal objects of the invention is to provide a lens supporting structure of the commercially known half-rim type for supporting the lenses of an ophthalmic mounting embodying lens straps for connection with the nasal and temporal sides of the respective lenses joined by a resilient arm each shaped to follow the upper contour edge of the respective lenses and adapted to obviate the introduction of strain and to compensate for differences in the distances between the lens connection openings and the lens straps when connected with the lenses and terminating in an outwardly and rearwardly extending temple support to which temples are pivotally connected.

Another object is to provide a lens supporting structure as set forth above wherein the bar members are in the form of a flexible cable joining the lens straps.

Another object is to provide a mounting of the above nature which is so constructed that strain introduced by pressure exerted upon the temple endpieces in either a horizontal or vertical direction will be taken up by the supporting structure rather than by the lenses.

Other objects and advantages of the invention will become apparent from the following description taken in connection with the accompanying drawings and it will be apparent that many changes may be made in the details of construction, arrangement of parts and method shown and described without departing from the spirit of the invention as expressed in the accompanying claim. I, therefore, do not wish to be limited to the exact details of construction, arrangement of parts and method shown and described as the preferred form only has been given by way of illustration.

Referring to the drawings:

Fig. 1 is a front elevational view of a mounting embodying the invention;

Fig. 2 is an enlarged rear elevational view of a portion of the mounting as shown in Fig. 1;

Fig. 3 is an enlarged sectional view of the supporting arm as taken on line 3—3 of Fig. 2; and Fig. 4 is a fragmentary sectional view as taken on line 4—4 of Fig. 1, showing the several parts in assembled relation with each other.

In prior art constructions of this nature wherein the bars or lens supporting arms are connected at both the nasal and temporal sides of the lenses, the bars or arms were usually formed rigid and required special adjustment to shape them to the contour shape of the lenses.

In instances when the location of the connection openings in the lenses varied with respect to the related positions of the lens straps considerable difficulty arose in introducing strain in the lenses particularly when said related positions were not carefully controlled by adjusting the arm while simultaneously shaping the arm to the upper contour shape of the lenses. If the distance between the lens straps was greater than the connection openings in the lenses and the said straps were connected with the lenses, the arms tended to cause a considerable strain on the lenses which often resulted in lens breakage.

With prior art arrangements of the above nature, therefore, great skill was required in properly adjusting the arms and lens straps to the requirement of the lenses in order to obviate strain.

The present invention overcomes the above difficulty through the provision of a readily flexible self-adjusting arm which will automatically compensate for any variation in the distance between the lens straps and connection openings and which will permit some latitude of adjustment for proper alignment of the arms with the upper contour edges of the lenses with substantially no change as to the yieldable nature of the arms.

Referring more particularly to the drawings wherein like characters of reference designate like parts throughout the several views, the device embodying the invention comprises a pair of lenses 5 connected by a bridge member 6 which is secured to the lenses by means of the lens straps 7. The said lens straps are provided with openings aligned with openings in the lenses through which a screw or other suitable connecting means 8 may be positioned to secure the lenses to the straps.

The bridge member 6, as shown in the drawings, is provided with a central arch portion 9 and depending side portions 10 which are secured, by solder or the like, to the lens straps 7. It is to be understood that in the present invention any shape or style bridge may be used and that the one shown is by way of illustration only.

The lens straps 7 are provided with a plurality of blade springs or the like 11 interposed between the inner surfaces of the edge portions of the straps and the adjacent edges of the lenses and are adapted to resiliently limit the pivotal movement of the lens straps relative to the lenses to relieve shock and strain at the nasal sides thereof.

Nose pad supporting arms 12 are secured to the lens straps 7 and are adapted to extend rearwardly and downwardly and terminate in nose pad connection ends to which the nose pads 13 are connected.

The long and slender temple supporting bar or arm members 14 are shaped substantially to follow the contour shape of the upper edges of the lenses and are preferably adapted to be in the rear of the plane of said lenses as illustrated in Fig. 4. The said bar or arm members in this instance are secured to the rear of the lens straps 7 and to the adjacent sides of the nose pad arms 12 by soldering, welding or the like and are provided adjacent their opposite ends with outwardly and rearwardly deflected endpiece portions 15 having a pivotal connection 16 with the temples 17.

The long and slender temple supporting bar or arm members 14, as shown in Fig. 2, are composed of a flexible cable portion 18 extending throughout the major portion of the length thereof and having their outwardly and rearwardly extending portions 15 formed of a solid relatively rigid material. The portion 18 of the temple supporting members, as shown in the enlarged sectional view of Fig. 3, has a core 19 of any suitable material such as gold, stainless steel, beryllium, copper, inconel, nickel, nickel silver or the like surrounded by a coil or winding 20 of strands of any suitable metallic material such as gold, nickel, nickel silver, inconel, stainless steel, beryllium, copper or the like and having a further outer coil or winding 21 thereon of material of a non-corrosive material or precious metal such as gold, gold-filled with pure nickel or stainless steel base or of stainless steel or any other suitable material, the material of the solid portion 15 being preferably formed to match the color of the material of the outer coil or winding 21. The portion 14 and the portion 15 may be joined together by any suitable means such as soldering, welding or the like.

It is also to be understood that the different metals may be produced with different hardness.

Although the bar or arm members 14, as shown in Fig. 2, are composed of a flexible cable portion 18 extending substantially throughout the entire length thereof, it is to be understood that the nasal portion of said bar or arm may be formed of a relatively solid material extending upwardly from its connection to the lens strap to substantially the vertical center line of the lens or adjacent said location with the result that only a short flexible section is provided. The short flexible section on the other hand may be located only adjacent the nasal side of the arm or centrally of the arm if desired, the main factor being, however, that the arm be provided with a flexible self-adjusting section which will relieve strain.

The temple supporting arms 14 are provided adjacent their temporal ends with depending adjustable lens connection means 22, preferably secured, as illustrated at 23, to the underside surface of the temple supporting portion 15 by soldering, welding or the like.

The lens connection means each have an adjustable intermediate portion 25 which extends downwardly substantially along the adjacent contour edge of the lens and thence turns inwardly and terminates in a perforated ear 26. The ear 26 is adapted to overlie the opening in the lens and is adapted to be secured to the lens by a screw or other suitable securing means 27. The lens connection means 22 is adapted to overlie the inner side surface only of the lens and the lens connection means 27 is adapted to engage and be connected with a suitable nut or the like 28 overlying the front surface of the lens in alignment with the opening.

It will be seen that if there is a slight difference in the distance between the lens connection openings in the lens and the lens strap ears 7 or 26 that the arm or bar 14 will readily flex to permit ease of connection of said strap ears with the lens with substantially no introduction of strain.

Although the temple supporting bar or arm 14 is readily flexible throughout the length of its cable portion, it still can be adjusted to follow the upper contour shape of the lens and will retain said adjustment to a sufficient degree.

This arrangement, while removing strain which might be introduced by the arm 14, such as previously referred to herein in connection with prior art structures, does provide temple supporting means which extends outwardly and rearwardly from the plane of the rear surface of the lens with the result that there is no protruding endpiece portions which might be accidentally engaged and by which the mounting may be displaced from the face and broken.

The relatively rigid and adjustable characteristics of portion 15 enables the distance between the temples to be altered and the inclination of the temples to be altered independently of the fitted relation of the arm 14 with the lenses.

Although the bars or arms 14 have been described as being preferably located in the rear of the plane of the upper inner surfaces of the lenses, it is to be understood that they may be located in the plane of the lenses or forwardly thereof if desired and yet be shaped to follow substantially the upper contour shape of the lenses.

From the foregoing description it will be seen that simple, efficient and economical means have been provided for accomplishing all of the objects and advantages of the invention.

Having described my invention, I claim:

A lens supporting structure for the lenses of an ophthalmic mounting, said supporting structure comprising a central bridge portion having lens connection means on its opposed sides adapted for connection with the nasal sides of lenses to be assembled with the supporting structure, and a pair of temple pivot portions, said temple pivot portions each embodying a lens connection portion adapted to be connected with the temporal side of said lenses, a portion of relatively rigid material extending upwardly from said lens connection portion shaped to the adjacent contour shape of said lenses, and having a rearwardly extending temple hinge portion of relatively rigid material joined thereto, said temple hinge portion being disposed in a fixed angular position relative to the lens connection portion, and long and slender flexible cable-like arm portions having their nasal ends secured adjacent the opposed sides of said bridge portion and being shaped to follow substantially the upper contour shape of the lenses when assembled therewith and having their temporally disposed ends secured to the upwardly extending rigid portion of said temple pivot portions so as to provide the supporting structure as a unitary member, said long and slender arm portions each having substantially the same cross-sectional shape and dimension as the upwardly extending rigid portion to which they are secured, and each embodying spirally wound strands forming a plurality of coils arranged in helical form, with said coils imparting to the arm portion a readily flexible and self-adjusting characteristic such as to allow the arm portion to accommodate itself to approximately the shape of the adjacent contour of the respective lens to be assembled therewith, said coils by reason of their helical arrangement individually pivoting slightly during flexing of said arm portion so as to avoid the concentration of strain adjacent the ends of the arm portion.

WILBUR LEDUC.

REFERENCES CITED

The following references are of record in the file of this patent:

UNITED STATES PATENTS

| Number | Name | Date |
|---|---|---|
| 1,197,214 | Laflin | Sept. 5, 1916 |
| 1,918,982 | Poeton | July 18, 1933 |
| 2,253,960 | Splaine | Aug. 26, 1941 |
| 2,254,746 | Line | Sept. 2, 1941 |
| 2,256,502 | Splaine | Sept. 23, 1941 |
| 2,290,389 | Slotsky | July 21, 1942 |
| 2,376,977 | Page | May 29, 1945 |
| 2,383,572 | Splaine et al. | Aug. 28, 1945 |
| 2,384,815 | Cozzens | Sept. 18, 1945 |